United States Patent
Witthuhn et al.

(10) Patent No.: US 9,701,445 B2
(45) Date of Patent: Jul. 11, 2017

(54) LINERS FOR BULK CONTAINERS

(71) Applicant: BEMIS COMPANY, INC, Neenah, WI (US)

(72) Inventors: Rusty L. Witthuhn, Appleton, WI (US); Kevin P. Nelson, Appleton, WI (US)

(73) Assignee: Bemis Company, Inc., Neenah, WI (US)

( * ) Notice: Subject to any disclaimer, the term of this patent is extended or adjusted under 35 U.S.C. 154(b) by 0 days.

(21) Appl. No.: 15/100,052

(22) PCT Filed: Dec. 20, 2013

(86) PCT No.: PCT/US2013/076843
§ 371 (c)(1),
(2) Date: May 27, 2016

(87) PCT Pub. No.: WO2015/094325
PCT Pub. Date: Jun. 25, 2015

(65) Prior Publication Data
US 2017/0021970 A1    Jan. 26, 2017

(51) Int. Cl.
*B65D 25/16*    (2006.01)
*B65D 25/14*    (2006.01)
(Continued)

(52) U.S. Cl.
CPC ............ *B65D 25/16* (2013.01); *B29C 47/004* (2013.01); *B29C 47/0064* (2013.01);
(Continued)

(58) Field of Classification Search
CPC ...... B65D 25/16; B65D 90/046; B65B 3/045; B29C 47/065; B29C 47/004;
(Continued)

(56) References Cited

U.S. PATENT DOCUMENTS 4,596,040 A    6/1986    LaFleur et al.
4,796,788 A    1/1989    Bond
(Continued)

FOREIGN PATENT DOCUMENTS

WO    9526268 A1    10/1995
WO    2009018659 A1    2/2009

OTHER PUBLICATIONS

Moriyama, Takamasa, Asano, Kuniyoshi & Iwanami, Teruo, "Drawability and Flex Crack Resistance of Modified EVOH", The Nippon Synthetic Chemical Industry Co., LTD, Osaka, Japan (Nippon Gohsei).

(Continued)

*Primary Examiner* — Michael C Miggins
(74) *Attorney, Agent, or Firm* — Lynn M. Nett

(57) ABSTRACT

Described are liners for bulk containers such as intermediate bulk containers (IBC) that are abuse-resistant and barrier-providing. The liners have at least one sidewall that is multi-plied and the plies are multi-layered. The liners are preferably metal-free. Each ply independently comprises at least three layers that comprise: a first layer and a third layer each comprising a linear low density polyethylene (LLDPE) or a very low density polyethylene (VLDPE); and a second layer between the first and third layers and comprising a thermoplastic oxygen barrier of ethylene-vinyl alcohol copolymer (EVOH) and a thermoplastic elastomer (TPE). A ply may further comprise a fourth layer and a fifth layer, each comprising a polyamide, the fourth layer being located between the first and second layers and the fifth layer being located between the second and third layers. Methods of making and using the liners are also provided.

21 Claims, 2 Drawing Sheets

(51) Int. Cl.

| | | |
|---|---|---|
| *B32B 7/12* | (2006.01) | |
| *B32B 27/08* | (2006.01) | |
| *B32B 27/30* | (2006.01) | |
| *B32B 27/34* | (2006.01) | |
| *B32B 27/36* | (2006.01) | |
| *B29C 47/06* | (2006.01) | |
| *B29C 47/00* | (2006.01) | |
| *B29C 65/48* | (2006.01) | |
| *B65B 3/04* | (2006.01) | |
| *B65D 90/04* | (2006.01) | |
| *B29K 23/00* | (2006.01) | |
| *B29K 29/00* | (2006.01) | |
| *B29L 9/00* | (2006.01) | |
| *B29L 31/00* | (2006.01) | |

(52) U.S. Cl.
CPC ........ *B29C 47/0066* (2013.01); *B29C 47/065* (2013.01); *B29C 65/48* (2013.01); *B32B 7/12* (2013.01); *B32B 27/08* (2013.01); *B32B 27/306* (2013.01); *B32B 27/34* (2013.01); *B32B 27/36* (2013.01); *B65B 3/045* (2013.01); *B65D 25/14* (2013.01); *B65D 90/046* (2013.01); *B29K 2023/0616* (2013.01); *B29K 2023/0625* (2013.01); *B29K 2029/00* (2013.01); *B29K 2995/0067* (2013.01); *B29L 2009/00* (2013.01); *B29L 2031/7128* (2013.01); *B32B 2250/05* (2013.01); *B32B 2250/24* (2013.01); *B32B 2270/00* (2013.01); *B32B 2274/00* (2013.01); *B32B 2307/7244* (2013.01); *B32B 2439/00* (2013.01)

(58) Field of Classification Search
CPC ... B29C 47/066; B29C 47/0064; B29C 65/48; B29K 2023/0625; B29K 2023/0616; B29K 2029/00; B29K 2995/0067; B29L 2009/00; B29L 2031/7128
See application file for complete search history.

(56) References Cited

U.S. PATENT DOCUMENTS

| | | |
|---|---|---|
| 6,607,097 B2 | 8/2003 | Savage et al. |
| 7,964,226 B2 | 6/2011 | Lee et al. |
| 8,075,188 B2 | 12/2011 | Plunkett et al. |
| 8,252,397 B2 | 8/2012 | Breck |
| 2006/0214331 A1 | 9/2006 | Jacobs |
| 2007/0237433 A1 | 10/2007 | Plunkett et al. |
| 2008/0190918 A1 | 8/2008 | Bellmore |
| 2012/0199512 A1 | 8/2012 | Plunkett et al. |

OTHER PUBLICATIONS

Mayumi, Junji, Nakagawa, Atsushi, Matsuhisa, Keiko, Takahashi, Hedeki, Takahashi, Hiroshi, & Iijima, Michihiro; "Material Design & Manufacture of a New Thermoplastic Polyester Elastomer" Polymer Journal, 2008, pp. 1-9, vol. 40, No. 1, Japan.

LINERS FOR BULK CONTAINERS

TECHNICAL FIELD

The present disclosure relates to liners for bulk containers such as drums and rigid intermediate bulk containers (IBC) that are abuse-resistant, i.e., show excellent flex-crack resistance, and are barrier-providing. The liners are multi-plied and the plies are multi-layered. The liners comprise multi-layered plies comprising an ethylene-vinyl alcohol (EVOH) copolymer film layer with a thermoplastic elastomer (TPE) centered between linear low density polyethylene (LLDPE) or very low density polyethylene (VLDPE) layers.

BACKGROUND

Industrial packaging of liquid products needs to meet many kinds of requirements to ensure the product remains protected during shipping. Some requirements include providing oxygen barrier protection and providing abuse resistance such that the packaging resists cracking and pinholes. Historically, metal-containing polymer films have been used for oxygen barrier purposes as an outer ply of a bulk container liner. The presence of metal in the films, however, makes recycling of the liner complex and expensive. Also historically, mono-layered polymer films of linear low density polyethylene (LLDPE) have been used for abuse resistance as inner plies of the bulk container liners.

There is an on-going need to provide bulk container liners that provide excellent protection to the products being shipped, while at the same time are economical to both make and recycle.

SUMMARY

In order to minimize the use of metals in bulk container liners, it has been found that multi-layered plies comprising an ethylene-vinyl alcohol ("EVOH") copolymer film with a thermoplastic elastomer (TPE) centered between linear low density polyethylene (LLDPE) or very low density polyethylene (VLDPE) layers provide both oxygen barrier protection and flex crack resistance. Configuration of the plies and the layers may be tailored depending on the nature of the liquid products to be packaged.

In an aspect, provided are liners for a bulk container, the liners comprising: at least one sidewall comprising at least first and second plies, each ply independently comprising at least three layers that comprise: a first layer and a third layer each comprising a linear low density polyethylene (LLDPE) or a very low density polyethylene (VLPDE), and a second layer between the first and third layers and comprising a thermoplastic oxygen barrier of ethylene-vinyl alcohol copolymer (EVOH) and a thermoplastic elastomer (TPE); and a fitment attached to the at least one sidewall.

Other features that may be used individually or in combination with respect to any aspect of the invention are as follows.

The liner may be metal-free.

The TPE may comprise a polyester TPE, a polyamide TPE or a polyurethane TPE. Further, the TPE may be a block copolymer that comprises rigid and flexible segments whereby those segments comprise polyamides, copolyamides, polyesters, copolyesters, polycarbonates, polyurethanes, polyethers or copolyethers. The TPE may comprise both aliphatic and aromatic components. The TPE may comprise block copolymers including polyamide-esters, polyamide-ethers, polyamide-ester-ethers, polyester-esters, polyester-ethers, polyester-ester-ethers, polyurethane-esters, polyurethane-ethers, polyurethane carbonates and polyurethane-ester-ethers.

The first ply may further comprise a fourth layer and a fifth layer, each comprising a polyamide, the fourth layer being located between the first and second layers and the fifth layer being located between the second and third layers. The polyamide may comprise nylon 66, nylon 610, nylon 66/610, nylon 6/66, nylon 11, nylon 6, nylon 66T, nylon 612, nylon 12, nylon 6/12, nylon 6/69, nylon 46, nylon 6-3-T, nylon MXD-6, nylon MXDI, nylon 12T and nylon 6I/6T or blends thereof.

The liner may further comprise a third ply adjacent to and having the same composition as the first ply and a fourth ply adjacent to and having the same composition as the second ply. Or, the liner may further comprise a third ply as an outer ply, the third ply comprising at least three layers that comprise a first layer and a third layer each comprising a linear low density polyethylene (LLDPE) or a very low density polyethylene (VLDPE), a second layer between the first and third layers and comprising metalized oriented polyethylene terephthalate (OPET).

The first ply may be an outer ply and the second ply may be an inner ply. Or, the first ply may be an inner ply and the second ply may be an outer ply.

Both the first and second plies may further comprise a fourth layer and a fifth layer, each comprising a polyamide, the fourth layer being located between the first and second layers and the fifth layer being located between the second and third layers.

The layers of the first ply, the second ply, or both plies may be coextruded The first ply, the second ply, or both plies may further independently comprise one or more tie layers between the at least three layers of both the first and second plies.

In a detailed aspect, provided is a liner for a bulk container, the liner comprising at least one sidewall that comprises: first and second plies, each ply comprising five layers that comprise: a first layer and a third layer each comprising a linear low density polyethylene (LLDPE) or a very low density polyethylene (VLDPE); a second layer between the first and third layers and comprising a thermoplastic oxygen barrier of ethylene-vinyl alcohol copolymer (EVOH) and a thermoplastic elastomer (TPE); a fourth layer and a fifth layer, each comprising a polyamide, the fourth layer being located between the first and second layers and the fifth layer being located between the second and third layers; third and fourth plies, each ply comprising three layers that comprise: a first layer and a third layer each comprising a linear low density polyethylene (LLDPE) or a very low density polyethylene (VLDPE); a second layer between the first and third layers and comprising a thermoplastic oxygen barrier of ethylene-vinyl alcohol copolymer (EVOH) and a thermoplastic elastomer (TPE); and a fitment attached to the at least one sidewall; wherein all of the layers of the plies are coextruded and are metal-free. The four plies may be positioned in any sequence relative to one another. In some embodiments, the first ply may be an outer ply and the fourth ply may be an inner ply. Or, the first ply may be an inner ply and the fourth ply may be an outer ply.

Other aspects provide methods of making a liner for a bulk container, the methods comprising: coextruding a first polymer resin through a die thereby forming a tubular extrudate comprising at least three layers that comprise a first layer and a third layer each comprising a linear low density polyethylene (LLDPE) or a very low density polyethylene (VLDPE), a second layer between the first and third layers and comprising a thermoplastic oxygen barrier of ethylene-vinyl alcohol copolymer (EVOH) and a thermoplastic elastomer (TPE); collapsing the tubular extrudate between rollers to form a flat sheet, slitting the sheet to form two separate plies, and winding the two plies onto a roll thereby forming a double wound first film; forming two sidewalls from the double wound first film; adhering the two sidewalls to each other to create a seam thereby forming a two-plied bag; and attaching a fitment to one of the sidewalls to form a liner.

The method may further comprise: coextruding a second polymer resin through a die thereby forming a tubular extrudate comprising at least three layers that comprise a first layer and a third layer each comprising a linear low density polyethylene (LLDPE) or a very low density polyethylene (VLDPE), a second layer between the first and third layers and comprising a thermoplastic oxygen barrier of ethylene-vinyl alcohol copolymer (EVOH) and a thermoplastic elastomer (TPE), a fourth layer and a fifth layer, each comprising a polyamide, the fourth layer being located between the first and second layers and the fifth layer being located between the second and third layers; collapsing the tubular extrudate between rollers to form a flat sheet, slitting the sheet to form two separate plies, and winding the two plies onto a roll thereby forming a double wound second polymer film having a first ply and a second ply; placing the first double wound polymer film proximate the second double wound polymer film; and forming two sidewalls from the first and second double wound polymer films; adhering the two sidewalls to each other to create a seam thereby forming a four-plied bag.

In another aspect, provided is a method of providing a liquid product in a bulk container, the method comprising: obtaining the liner of any embodiment disclosed herein; and packaging the liquid product in the liner. The liquid product may comprise a fruit or vegetable.

These and other aspects of the invention are described in the detailed description below. In no event should the above summary be construed as a limitation on the claimed subject matter.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. It will be understood, however, that the use of a number to refer to a component in a given figure is not intended to limit the component in another figure labeled with the same number.

DETAILED DESCRIPTION

Figure 1:
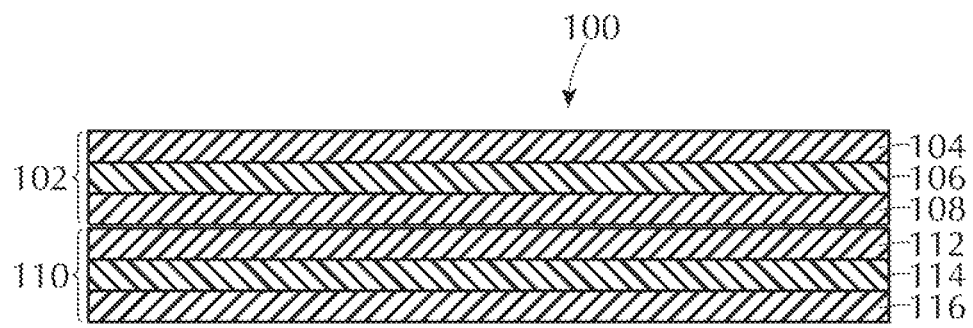
FIGS. 1-3 are schematic cross-section views of exemplary plies of different embodiments of liners.

Provided are liners for bulk containers such as drums and rigid intermediate bulk containers. The liners comprise a fitment and at least one sidewall having at least two plies that are multi-layered, the plies being sealed together and the fitment being attached to the at least one sidewall. The liner fits in a bulk container.

A "ply" as used herein refers to a building block of sidewalls of a liner that may be supplied as a polymer film.

A single wound polymer film supplies one ply and a double wound polymer film supplies two plies. Films used to form plies herein may be coextruded.

A "layer" as used herein refers to a structure of a single polymer-type or a blend of polymers that may be accompanied by additives. Plies used herein are multi-layered.

Reference to "outer ply" as used herein refers to the portion of the liner that is subject to wear and tear from the environment during shipping. The outer ply is in contact with an internal surface of a bulk container during use.

Reference to "inner ply" as used herein refers to the portion of the liner that forms an interior surface of the enclosed liner and directly contacts product that is packaged in the liner.

As used herein, the term "polymer" refers to the product of a polymerization reaction, and is inclusive of homopolymers, copolymers, terpolymers; etc. In general, the layers of a film can consist essentially of a single polymer, or can have still additional polymers together therewith, i.e., blended therewith.

As used herein, "EVOH" refers to ethylene-vinyl alcohol copolymer. EVOH is otherwise known as saponified or hydrolyzed ethylene-vinyl acetate copolymer, and refers to a vinyl alcohol copolymer having an ethylene comonomer. EVOH is prepared by the hydrolysis (or saponification) of an ethylene-vinyl acetate copolymer. The degree of hydrolysis is preferably from about 50 to 100 mole percent, more preferably from about 85 to 100 mole percent, and most preferably at least 97%. It is well known that to be a highly effective oxygen barrier, the hydrolysis-saponification must be nearly complete, i.e., to the extent of at least 97%. EVOH is commercially available in resin form with various percentages of ethylene and there is a direct relationship between ethylene content and melting point. For example, EVOH having a melting point of about 175° C. or lower is characteristic of EVOH materials having an ethylene content of about 38 mole percent or higher. EVOH having an ethylene content of 38 mole percent has a melting point of about 175° C. With increasing ethylene content, the melting point is lowered. A melting point of about 158° C. corresponds to an ethylene content of 48 mole percent. EVOH copolymers having lower or higher ethylene contents may also be employed. It is expected that processability and orientation would be facilitated at higher ethylene contents; however, gas permeabilities, particularly with respect to oxygen, may become undesirably high for certain packaging applications which are sensitive to microbial growth in the presence of oxygen. Conversely, lower contents may have lower gas permeabilities, but processability and orientation may be more difficult. In some embodiments, ethylene-vinyl alcohol copolymers comprise from about 27-38 mole % ethylene, or even 27-29 mole % ethylene.

The term "polyamide" means a high molecular weight polymer having amide linkages (—CONH—)$_n$ which occur along the molecular chain, and includes "nylon" resins which are well known polymers having a multitude of uses including utility as packaging films, bags, and casings. See, e.g., Modern Plastics Encyclopedia, 88 Vol. 64, No. 10A, pp 34-37 and 554-555 (McGraw-Hill, Inc., 1987) which is hereby incorporated by reference. Polyamides are preferably selected from nylon compounds approved for use in producing articles intended for use in processing, handling, and packaging food.

The term "nylon" as used herein refers more specifically to synthetic polyamides, either aliphatic or aromatic, either in crystalline, semi-crystalline, or amorphous form characterized by the presence of the amide group —CONH. It is intended to refer to both polyamides and co-polyamides Linear low density polyethylenes (LLDPE) are copolymers of ethylene with alpha-olefins having densities from 0.915 to 0.940 g/m³. The alpha-olefin utilized is usually 1-butene, 1-hexene, or 1-octene and Ziegler-type catalysts are usually employed (although Phillips catalysts are also used to produce LLDPE having densities at the higher end of the range, and metallocene and other types of catalysts are also employed to produce other known variations of LLDPE).

Very low density polyethylenes (VLDPE) which may also be called "ultra low density polyethylenes" (ULDPE) comprise copolymers of ethylene with alpha-olefins, usually 1-butene, 1-hexene or 1-octene and are recognized by those skilled in the art as having a high degree of linearity of structure with short branching rather than the long side branches characteristic of LDPE. However, VLDPEs have lower densities than LLDPEs. The densities of VLDPEs are recognized by those skilled in the art to range between 0.860 and 0.915 g/cm³, An exemplary VLDPE is Attane™ Ultra Low Density Polyethylene 4701G available from Dow Chemical Company having a density of 0.912 g/cm³.

Preferably, polymers are selected from compositions approved as safe for producing articles intended for use in processing, handling and packaging of food, such as nylon resins approved by the U.S. Food and Drug Administration provided at 21 CFR §177.1500 ("Nylon resins"), which is incorporated herein by reference.

The term "adhesive layer," or "tie layer," refers to a layer or material placed on one or more layers to promote the adhesion of that layer to another surface. Preferably, adhesive layers are positioned between two layers of a multilayer film to maintain the two layers in position relative to each other and prevent undesirable delamination. Unless otherwise indicated, an adhesive layer can have any suitable composition that provides a desired level of adhesion with the one or more surfaces in contact with the adhesive layer material. Optionally, an adhesive layer placed between a first layer and a second layer in a multilayer film may comprise components of both the first layer and the second layer to promote simultaneous adhesion of the adhesive layer to both the first layer and the second layer to opposite sides of the adhesive layer.

A "sidewall" is a discrete piece of polymer film that is sealed to itself or another sidewall by, for example, welding or an adhesive, to form a bag. A "fitment" is a structure that provides an inlet/outlet for product-filling and/or product-dispensing from the bag.

The term "oxygen transmission rate" (OTR) is defined herein as the amount of oxygen in cubic centimeters ($cm^3$) that will pass through 100 $in^2$ of film in 24 hr. at 80% relative humidity (RH) and 23° C. (or $cm^3/100$ $in^2$ over 24 hr. at 80% R.H. and 23° C.). Packaging films which are useful as an oxygen barrier in this application are required to have an OTR value of from about 0-0.20 $cm^3/100$ $in^2$ over 24 hr. at 80% R.H. and 23° C. Oxygen transmission may be measured according to ASTM D-3985-81 which is incorporated herein by reference, Materials A layer having an ethylene/vinyl alcohol ("EVOH") copolymer film provides oxygen barrier protection, A TPE is added to an EVOH film to provide enhanced flex-crack resistance. An exemplary TPE is Hytrel® Thermoplastic Elastomer 4053FG NC010, available from DuPont Company.

Linear low density polyethylene (LLDPE) or very low density polyethylene (VLDPE) films provide abuse resistance layers to the liner as a whole and they are used on either side of the EVOH film to provide further protection to that layer. In some embodiments, a combination (i.e., LLDPE in one layer and VLDPE in another layer) or mixture (i.e. LLDPE and VLDPE combined in a single layer) of LLDPE and VLDPE are used.

Nylon or polyamide-based films may be interleaved with other layers as desired to provide further strength and protection to a ply. Examples of nylon polymeric resins for use in food packaging and processing include: nylon 66, nylon 610, nylon 66/610, nylon 6/66, nylon 11, nylon 6, nylon 66T, nylon 612, nylon 12, nylon 6/12, nylon 6/69, nylon 46, nylon 6-3-T, nylon MXD-6, nylon MXDI, nylon 12T and nylon 6I/6T disclosed at 21 CFR §177.1500, Examples of polyamides include nylon homopolymers and copolymers such as those selected form the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly (caprolactam-co-dodecanediamide)), nylon 6,6/6 (poly(hexamethylene adipamide-co-caprolactam)), nylon 66/610 (e.g., manufactured by the condensation of mixtures of nylon 66 salts and nylon 610 salts), nylon 6/69 resins (e.g., manufactured by the condensation of epsilon-caprolactam, hexamethylenediamine and azelaic acid), nylon 11 (polyundecanolactam), nylon 12 (polylauryllactam) and copolymers or mixtures thereof.

Between any of the layers, a tie or adhesive layer may be provided to provide adhesion and continuity between the layers. Adhesive compositions invention may include, but are not limited to: modified and unmodified polyolefins, preferably polyethylene, most preferably, ethylene-α-olefin copolymer, modified and unmodified acrylate resin, preferably selected from the group consisting of ethylene-methyl acrylate copolymer, ethylene-ethyl acrylate copolymer, ethylene-butyl acrylate copolymer, or blends thereof. EVA is an ethylene-vinyl acetate co-polymer, which may be used in particular to form a layer to facilitate bonding of polymerically dissimilar layers.

Features

The liner sidewalls may be configured as needed to fit into the desired bulk container. For example, a pillow bag has seals around four edges of two plies. An exemplary bag has inner dimensions of about 81 inches (205 cm) wide by about 85" (216 cm) long.

Regarding fitments, one or more of them may be affixed through a ply for filling and dispensing from the liners. They may be any structure suitable for sealing the liquid within the liner, for example a threaded tube may be affixed through a ply and a cap threads onto the tube.

Fabrication

In general terms, to form films for liners disclosed herein, the following steps are used. Films may be fabricated by any coextrusion method known to a person of ordinary skill in the art. Films described in the Examples herein were manufactured by the following steps: (a) adding to extruders thermoplastic resins that are suitable to result in a multi-layered film; (b) heating the thermoplastic resins to form streams of melt-plasticized polymers; (c) forcing the streams of melt-plasticized polymers through a multi-orifice annular die to form a tubular extrudate having a diameter and a hollow interior; (d) expanding the diameter of the tubular extrudate by a volume of fluid entering the hollow interior via the central orifice, (e) and collapsing the tubular extrudate onto itself to form a continuous sheet having two plies joined at their edges. An optional additional step includes: (f) slitting the edges of the two ply sheets and rolling the resulting sheets to form a double wound film.

Upon formation of double wound films of desired designs, films are cut to desired sizes and at least one sidewall is formed from a section of film. A fitment is attached to the sidewall. The sidewall may be sealed to itself to another sidewall to form a liner. Seals between the sidewall(s) may be achieved by methods known in the art, for example, by heat welding or by use of an adhesive.

Before describing several exemplary embodiments of the invention, it is to be understood that the invention is not limited to the details of construction or process steps set forth in the following description. The invention is capable of other embodiments and of being practiced or being carried out in various ways.

Figure 2:
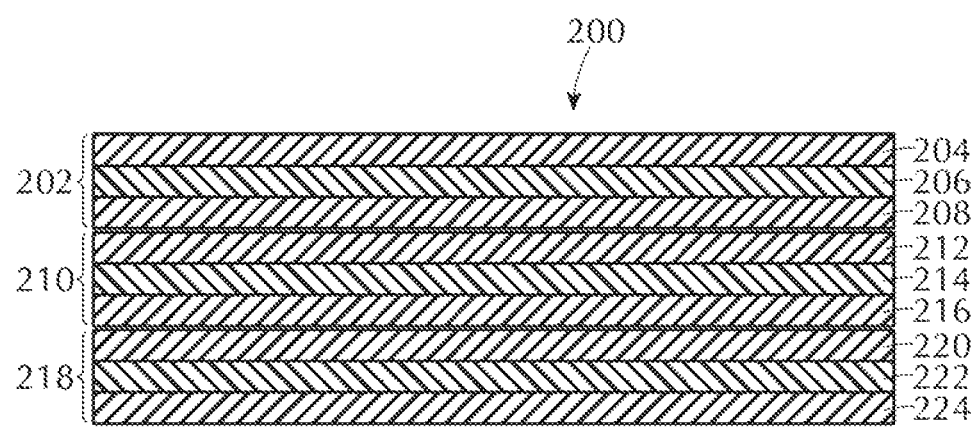
Figure 3:
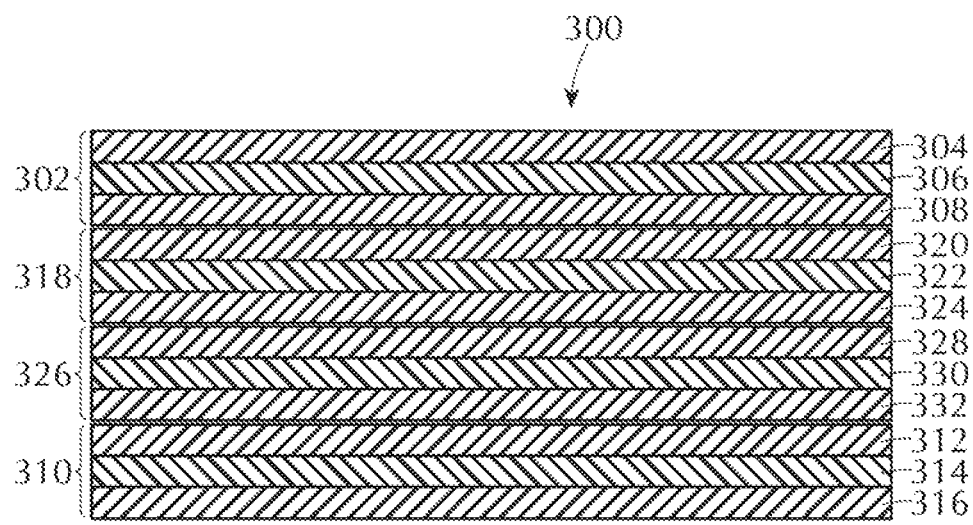

Turning to the figures. FIGS. 1-3 are schematic cross-section views of exemplary plies of different embodiments of liners. in FIG. 1, the liner 100 comprises a first ply 102 and a second ply 110. The first ply 102 comprises a first layer 104, a second layer 106, and a third layer 108. In this embodiment, the first layer 104 and the third layer 108 comprise the same material and the second layer 106, located between the first and third layers, is a different material. The second ply 110 comprises a first layer 112, a second layer 114, and a third layer 116. In this embodiment, the first layer 112 and the third layer 116 comprise the same material and the second layer 114, located between the first and third layers, is a different material. The plies 102 and 110 of the embodiment of FIG. 1 may be the same or different design. For example, plies 102 and 110 may independently further comprise a fourth layer (not shown) between the first and second layers and a fifth layer (not shown) between the second and third layers.

FIG. 2 shows a liner 200 comprising a first ply 202, a second ply 210, and a third ply 218. The first ply 202 comprises a first layer 204, a second layer 206, and a third layer 208. In this embodiment, the first layer 204 and the third layer 208 comprise the same material and the second layer 206, located between the first and third layers, is a different material. The second ply 210 comprises a first layer 212, a second layer 214, and a third layer 216. In this embodiment, the first layer 212 and the third layer 216 comprise the same material and the second layer 214, located between the first and third layers, is a different material. The third ply 218 comprises a first layer 220, a second layer 222, and a third layer 224. In this embodiment, the first layer 220 and the third layer 224 comprise the same material and the second layer 222, located between the first and third layers, is a different material. Plies 202 and 210 of the embodiment of FIG. 2 are the same design and ply 218 has a different design and may further comprise a metal-containing layer located between either the first and second layers or the second and third layers.

FIG. 3 shows a liner 300 comprising a first ply 302, a second ply 310, a third ply 318, and a fourth ply 326. The first ply 302 comprises a first layer 304, a second layer 306, and a third layer 308. In this embodiment, the first layer 304 and the third layer 308 comprise the same material and the second layer 306, located between the first and third layers, is a different material. The second ply 310 comprises a first layer 312, a second layer 314, and a third layer 316. In this embodiment, the first layer 312 and the third layer 316 comprise the same material and the second layer 314, located between the first and third layers, is a different material. The third ply 318 comprises a first layer 320, a second layer 322, and a third layer 324. In this embodiment, the first layer 320 and the third layer 324 comprise the same material and the second layer 322, located between the first and third layers, is a different material. The fourth ply 326 comprises a first layer 328, a second layer 330, and a third layer 332. In this embodiment, the first layer 328 and the third layer 332 comprise the same material and the second layer 330, located between the first and third layers, is a different material. Plies 302 and 318 of the embodiment of FIG. 3 are the same design and plies 310 and 326 are the same design that may be the same or different from plies 302 and 318. For example, both plies 302 and 318 and/or both plies 310 and 326 may independently further comprise a fourth layer (not shown) between the first and second layers and a fifth layer (not shown) between the second and third layers.

Figure 4:
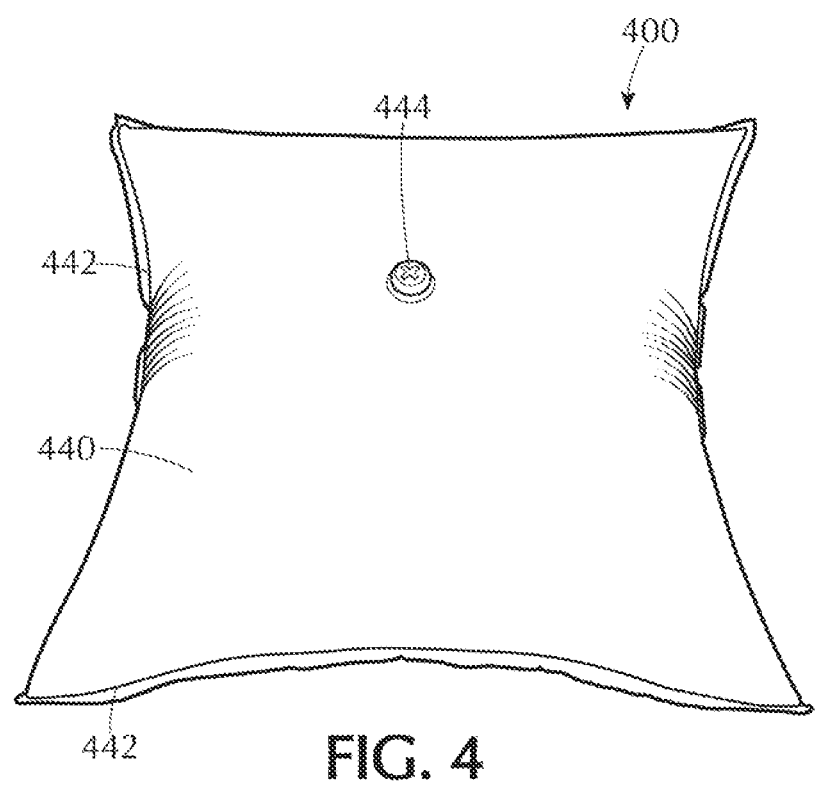
FIG. 4 is a schematic top view of a liner for a bulk container in accordance with an embodiment.

FIG. 4 is a schematic top view of a liner for a bulk container in accordance with an embodiment. The liner 400 comprises a sidewall 440 that has seams 442 to seal the sidewall 440 to another sidewall (not shown). Fitment 444 is attached to sidewall 440.

EXAMPLES

In the following examples, reference is made to "oxygen transmission rate" (OTR), and to one-hour Gelbo Flex Test results. Measurement of OTR was done in accordance with ASTM D-3985-81. The Gelbo Flex Test was done in accordance with ASTM F392 At best, there would be zero pinholes. A target range for pinholes is less than 10, or less than 5, or even less than 2.

Comparative Example 1

A two ply barrier film was formed from a collapsed bubble The structure and weight percents of a single ply were:
LLDPE 40.2%/tie 6.8%/EVOH 17.4%/tie 6.8%/LLDPE 15.4%/EVA 13.4%.

The EVOH layer had a 29 mole percent content of ethylene.

Due to the nature of the collapsed bubble forming process. the plies were orientated as a mirror image to one another (i.e., the EVA layers of each ply were in contact, and the outer LLDPE layers were both outward facing in the two ply combination), The resulting two ply film was a total of 0.0045 inches (114 μm) thick. The film had an oxygen barrier measurement of 0.06 cc/100 in$^2$/day at 23° C. and 80% relative humidity and a one hour Gelbo Flex Test result of 45 pinholes. Although the oxygen barrier measurement was acceptable, the number of pinholes was undesirable.

Comparative Example 2

A n-ionomer resin was included as an additive at 10% and 20% by weight amounts into a 29 mole percent EVOH layer in a single ply blown film having the structure and weight percents:
i) VLDPE+LLDPE 39.4%/tie 6.7%/EVOH+10% n-ionomer 17.3%/tie 6.7%/VLDPE+LLDPE 15.4%/LLDPE 14.6%.
ii) VLDPE+LLDPE 39.5%/tie 6.7%/EVOH+20% n-ionomer 17.0%/tie 6.7%/VLDPE+LLDPE 15.4%/LLDPE 14.7%.

The oxygen barrier for the 10% n-ionomer example was 0.043 cc/100 in²/day at 23° C. and 80%. The oxygen barrier for the 20% n-ionomer example was 0.09 cc/100 in2/day at 23° C. and 80%.

The addition of n-ionomer did not reduce the Gelbo Flex Test pinhole count as compared to Comparative Example 1.

Example 3

TPE resin (Hytrel 4053FG) was included as an additive at 10% by weight amount into a 29 mole percent EVOH layer into a collapsed blown film having the structure and weight percents:

VLDPE 19.9%/tie 3.4%/EVOH+10% TPE 8.7%/tie 3.4%/VLDPE 7.7%/EVA 13.8%/VLDPE 7.7%/tie 3.4%/ EVOH+10% TPE 8.7%/tie 3.4%/VLDPE 19.9%.

The resulting film was a total of 0.0045 inches (114 μm) thick. The oxygen barrier was 0.08 cc/100 in²/day at 23° C. and 80%. The Gelbo Flex Test pinhole count was 2 to 5 pinholes in one hour.

Example 4

A collapsed bubble film was prepared in the same manner as Example 3, except that the EVA layer was replaced with a VLDPE layer. The VLDPE layer allowed the collapsed bubble to be separated into two plies and double wound. The structure and weight percents of a single ply were:

VLDPE 39.7%/tie 6.8%/EVOH+10% TPE 17.4%/tie 6.8%/VLDPE 29.3%.

The resulting film had a two-ply thickness of 0.0045 inches (114 μm). The oxygen barrier was 0.055 cc/100 in²/day at 23° C. and 80% for a two ply sample. The Gelbo Flex Test pinhole count was 0 to 2 pin holes in one hour for a two-ply sample.

Example 5

A collapsed bubble film was prepared in the same manner as Example 4, except that two layers comprising a 80:20 blend of Nylon 6 and Nylon 6/66 were added. The structure and weight percents of a single ply were:

VLDPE 33.0%/tie 6.8%/Nylon blend 6.8%/EVOH+10% TPE 17.4%/Nylon blend 6.8%/tie 15.5%/VLDPE 13.8%.

The resulting film had a two-ply thickness of 0.0045 inches (114 μm). The oxygen barrier was 0.09 cc/100 in²/day at 23° C. and 80% for a two ply sample. The Gelbo Flex Test pinhole count was 0 to 2 pinholes in one hour for a two-ply sample.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention, It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A liner for a bulk container, the liner comprising:
   at least one sidewall comprising at least first and second plies, each ply independently comprising at least three layers that comprise:
      a first layer and a third layer each comprising a linear low density polyethylene (LLDPE) or a very low density polyethylene (VLDPE); and
      a second layer between the first and third layers and comprising a thermoplastic oxygen barrier of ethylene-vinyl alcohol copolymer (EVOH) and a thermoplastic elastomer (TPE); and
   a fitment attached to the at least one sidewall.

2. The liner of claim 1, wherein the liner is metal-free.

3. The liner of claim 1, wherein the TPE comprises a polyester TPE.

4. The liner of claim 1 further comprising a third ply adjacent to and having the same composition as the first ply and a fourth ply adjacent to and having the same composition as the second ply.

5. The liner of claim 1, wherein the first ply is an outer ply and the second ply is an inner ply.

6. The liner of claim 1, wherein the first ply is an inner ply and the second ply is an outer ply.

7. The liner of claim 1, wherein the layers of the first ply, the second ply, or both plies are coextruded.

8. The liner of claim 1, wherein the first ply, the second ply, or both plies further independently comprise one or more tie layers between the at least three layers of both the first and second plies.

9. The liner of claim 1, wherein the first and third layers comprise a linear low density polyethylene (LLDPE).

10. The liner of claim 1, wherein the first ply further comprises a fourth layer and a fifth layer, each comprising a polyamide, the fourth layer being located between the first and second layers and the fifth layer being located between the second and third layers.

11. The liner of claim 10 wherein the polyamide comprises nylon 66, nylon 610, nylon 66/610, nylon 6/66, nylon 11, nylon 6, nylon 66T, nylon 612, nylon 12, nylon 6/12, nylon 6/69, nylon 46, nylon 6-3-T, nylon MXD-6, nylon MXDI, nylon 12T and nylon 6I/6T or blends thereof.

12. The liner of claim 1 further comprising a third ply as an outer ply, the third ply comprising at least three layers that comprise a first layer and a third layer each comprising a linear low density polyethylene (LLDPE) or a very low density polyethylene (VLDPE), and a second layer between the first and third layers comprising metalized oriented polyethylene terephthalate (OPET).

13. The liner of claim 12, wherein both the first and second plies further comprise a fourth layer and a fifth layer, each comprising a polyamide, the fourth layer being located between the first and second layers and the fifth layer being located between the second and third layers.

14. A liner for a bulk container, the liner comprising at least one sidewall that comprises:
   first and second plies, each ply comprising five layers that comprise:
      a first layer and a third layer each comprising a linear low density polyethylene (LLDPE) or a very low density polyethylene (VLDPE);
      a second layer between the first and third layers and comprising a thermoplastic oxygen barrier of ethylene-vinyl alcohol copolymer (EVOH) and a thermoplastic elastomer (TPE);
      a fourth layer and a fifth layer, each comprising a polyamide, the fourth layer being located between the first and second layers and the fifth layer being located between the second and third layers;
   third and fourth plies, each ply comprising three layers that comprise:
      a first layer and a third layer each comprising a linear low density polyethylene (LLDPE) or a very low density polyethylene (VLDPE);
      second layer between the first and third layers and comprising a thermoplastic oxygen barrier of ethylene-vinyl alcohol copolymer (EVOH) and a thermoplastic elastomer (TPE); and
   a fitment attached to the at least one sidewall;
   wherein all of the layers of the plies are coextruded and are metal-free.

15. The liner of claim 14, wherein the TPE comprises a polyester TPE.

16. The liner of claim 14, wherein the first ply is an outer ply and the fourth ply is an inner ply.

17. The liner of claim 14, wherein the ply is an inner ply and the fourth ply is an outer ply.

18. A method of making a liner for a bulk container, the method comprising:
   coextruding a first polymer resin through a die thereby forming a tubular extrudate comprising at least three layers that comprise a first layer and a third layer each comprising a linear low density polyethylene (LLDPE) or a very low density polyethylene (VLDPE), a second layer between the first and third layers and comprising a thermoplastic oxygen barrier of ethylene-vinyl alcohol copolymer (EVOH) and a thermoplastic elastomer (TPE);
   collapsing the tubular extrudate between rollers to form a flat sheet, slitting the sheet to form two separate plies, and winding the two plies onto a roll thereby forming a double wound first film;
   forming two sidewalls from the double wound first film;
   adhering the two sidewalls to each other to create a seam thereby forming a two-plied bag; and
   attaching a fitment to one of the sidewalls to form a liner.

19. The method of claim 18 further comprising:
   coextruding a second polymer resin through a die thereby forming a tubular extrudate comprising at least three layers that comprise a first layer and a third layer each comprising a linear low density polyethylene (LLDPE) or a very low density polyethylene (VLDPE), a second layer between the first and third layers comprising a thermoplastic oxygen barrier of ethylene-vinyl alcohol copolymer (EVOH) and a thermoplastic elastomer (TPE), a fourth layer and a fifth layer, each comprising a polyamide, the fourth layer being located between the first and second layers and the fifth layer being located between the second and third layers;
   collapsing the tubular extrudate between rollers to form a flat sheet, slitting the sheet to form two separate plies, and winding the two plies onto a roll thereby forming a double wound second polymer film having a first ply and a second ply;
   placing the first double wound polymer film proximate the second double wound polymer film; and
   forming two sidewalls from the first and second double wound polymer films;
   adhering the two sidewalls to each other to create a seam thereby forming a four-plied bag.

20. A method of providing a liquid product in a bulk container, the method comprising:
   obtaining the liner of claim 1; and
   packaging the liquid product in the liner.

21. The method of claim 20, wherein the liquid product comprises a fruit or vegetable.

* * * * *

UNITED STATES PATENT AND TRADEMARK OFFICE
CERTIFICATE OF CORRECTION

PATENT NO. : 9,701,445 B2
APPLICATION NO. : 15/100052
DATED : July 11, 2017
INVENTOR(S) : Rusty L. Witthuhn and Kevin P. Nelson Page 1 of 1

It is certified that error appears in the above-identified patent and that said Letters Patent is hereby corrected as shown below:

On the Title Page

Column 2, item "(56)", under "Foreign Patent Documents", Line 1, delete "9526268" and insert -- 1995026268 --, therefor.

In the Specification

In Column 2, Line 32, after "coextruded" insert -- . --, therefor.
In Column 4, Line 18, after "terpolymers" delete ";" and insert -- , --, therefor.
In Column 5, Line 5, delete "g/m$^3$" and insert -- g/cm$^3$ --, therefor.
In Column 5, Line 22, after "g/cm$^3$" delete "," and insert -- . --, therefor.
In Column 5, Line 60, after "reference" delete "," and insert -- . --, therefor.

In the Claims

In Claim 14, Column 11, Line 28, before "second" insert -- a --, therefor.
In Claim 17, Column 11, Line 39, after "wherein the" insert -- first --, therefor.

Signed and Sealed this
Fourteenth Day of August, 2018

Andrei Iancu
*Director of the United States Patent and Trademark Office*